US008390795B2

(12) United States Patent
Kotler et al.

(10) Patent No.: US 8,390,795 B2
(45) Date of Patent: Mar. 5, 2013

(54) MULTIPLE MIRROR CALIBRATION SYSTEM

(75) Inventors: Zvi Kotler, Tel Aviv (IL); Boris Greenberg, Jerusalem (IL); Peter Grobgeld, Rehovot (IL)

(73) Assignee: Orbotech Ltd., Yavne (IL)

( * ) Notice: Subject to any disclaimer, the term of this patent is extended or adjusted under 35 U.S.C. 154(b) by 215 days.

(21) Appl. No.: 12/812,149

(22) PCT Filed: Jan. 11, 2009

(86) PCT No.: PCT/IL2009/000041
§ 371 (c)(1),
(2), (4) Date: Sep. 8, 2010

(87) PCT Pub. No.: WO2009/087638
PCT Pub. Date: Jul. 16, 2009

(65) Prior Publication Data
US 2010/0328643 A1 Dec. 30, 2010

Related U.S. Application Data

(60) Provisional application No. 61/020,273, filed on Jan. 10, 2008.

(51) Int. Cl.
*G01C 3/00* (2006.01)
(52) U.S. Cl. ...... 356/4.02; 356/3.01; 356/3.1; 356/4.01; 356/4.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| 4,270,130 | A  | * | 5/1981 | Houle et al. ........... 346/77 E |
| 6,615,099 | B1 | * | 9/2003 | Muller et al. .......... 700/166 |
| 6,809,290 | B2 |   | 10/2004 | Gross et al. |
| 6,819,038 | B2 |   | 11/2004 | Song et al. |
| 7,065,121 | B2 | * | 6/2006 | Filgas et al. ............. 372/64 |
| 7,078,650 | B2 |   | 7/2006 | Gross et al. |
| 7,147,889 | B2 |   | 12/2006 | Misura et al. |
| 7,176,409 | B2 |   | 2/2007 | Gross et al. |
| 7,206,120 | B2 |   | 4/2007 | Gross et al. |
| 2003/0011782 | A1 | * | 1/2003 | Tanno ................... 356/497 |
| 2006/0084957 | A1 |   | 4/2006 | Delfyett et al. |

OTHER PUBLICATIONS

Mitsunori Saito, et al., "Nanostructured Solid-Liquid Compounds with Rewritable Optical Functions", Applied Physics Letters, Aug. 2007, pp. 061114-1-061114-3, vol. 91, Issn. 6, American Institute of Physics.
International Search Report of PCT/IL2009/000041 dated May 13, 2009.

* cited by examiner

*Primary Examiner* — Luke Ratcliffe
(74) *Attorney, Agent, or Firm* — Sughrue Mion, PLLC

(57) ABSTRACT

An optical system including a plurality of selectably directable mirrors (38) each arranged to direct a laser beam (41) to a selectable location within a field, a plurality of mirror orientation sensors (45) operative to sense the orientation of the plurality of selectably directable mirrors and to provide mirror orientation outputs and an automatic calibration subsystem (47) for automatically calibrating the plurality of selectably directable mirrors, the automatic calibration subsystem including a target (40) being operative to provide an optically visible indication of impingement of a laser beam thereon; the target being rewritable and having optically visible fiducial markings (54, 56), a target positioner (42) for selectably positioning the target, an optical sensor (44) operative to view the target following impingement of the laser beam thereon and to provide laser beam impingement outputs and a correlator (36) operative to provide a calibration output.

14 Claims, 7 Drawing Sheets

MULTIPLE MIRROR CALIBRATION SYSTEM

CROSS REFERENCE TO RELATED APPLICATIONS

This application is a National Stage of International Application No. PCT/IL2009/000041 filed Jan. 11, 2009, claiming priority based on U.S. Patent Application No. 61/020,273 filed Jan. 10, 2008, the contents of all of which are incorporated herein by reference in their entirety.

Reference is made to U.S. Provisional Patent Application Ser. No. 61/202,273, filed Jan. 10, 2008 and entitled Multiple Laser Beam Positioning and Energy Delivery System, the disclosure of which is hereby incorporated by reference and priority of which is hereby claimed pursuant to 37 CFR 1.78 (a) (4) and (5)(i).

This application is related to the PCT Patent Application titled "Multiple Beam Drilling System," filed on even date, which is assigned to the assignee of the present invention and which is also incorporated herein by reference.

FIELD OF THE INVENTION

The present invention relates generally to apparatus calibration, and specifically to calibration of multiple steering mirrors used to direct laser beams.

BACKGROUND OF THE INVENTION

For a number of years laser beams have been used in fabrication systems, operating on an object such as a substrate, for such purposes as drilling, fusion, or ablation of the object. In order to reduce the time of fabrication, the systems may use multiple laser beams, and the requirements for the accuracy of such multi-beam systems is constantly increasing.

U.S. Pat. No. 6,615,099 to Müller et al., whose disclosure is incorporated herein by reference, describes a process for calibrating a laser processing machine, operating using a "deflection device." The process first generates an image of a calibration plate to determine imaging errors caused by the deflection device. The calibration plate is replaced by a test plate, upon which a test pattern is written and measured to determine an optical offset. Workpieces are processed in the machine by compensating for the imaging errors and the optical offset.

SUMMARY OF THE INVENTION

The present invention provides an improved system and method for calibration of multiple mirrors used to direct a laser beam.

There is thus provided in accordance with a preferred embodiment of the present invention an optical system including a plurality of selectably directable mirrors each arranged to direct a laser beam to a selectable location within a field, a plurality of mirror orientation sensors operative to sense the orientation of the plurality of selectably directable mirrors and to provide mirror orientation outputs and an automatic calibration subsystem for automatically calibrating the plurality of selectably directable mirrors, the automatic calibration subsystem including a target having an area at least as large as the field of each of the selectably directable mirrors and being operative to provide an optically visible indication of impingement of a laser beam thereon; the target being rewritable and having optically visible fiducial markings, a target positioner for selectably positioning the target in the fields of respective ones of the selectably directable mirrors while each respective one of the selectably directable mirrors directs the laser beam to a selectable location thereon, an optical sensor operative to view the target following impingement of the laser beam thereon and to provide laser beam impingement outputs and a correlator operative in response to the mirror orientation outputs and the laser beam impingement outputs to provide a calibration output.

In accordance with a preferred embodiment of the present invention the optical system may be operative in a calibration phase and in a production phase.

Preferably, the calibration phase includes orienting each of the plurality of mirrors in a first orientation, using the plurality of sensors to sense the first orientation of each of the plurality of mirrors and to provide a plurality of mirror orientation outputs, fixing the target to the target positioner, for each one of the plurality of selectably directable mirrors selectably positioning the target, by positioning the target positioner, in the field of the one of the plurality of selectably directable mirrors while the one of the plurality of selectably directable mirrors directs the laser beam to a selectable location thereon, generating laser beam impingement markings thereon, viewing the target following impingement of the laser beam thereon and providing laser beam impingement outputs for the one of the plurality of selectably directable mirrors and erasing the laser beam impingement markings and correlating the plurality of mirror orientation outputs and the laser beam impingement outputs to provide a calibration output for each of the plurality of selectably directable mirrors.

Alternatively, the calibration phase includes orienting each of the plurality of mirrors in a first orientation, using the plurality of sensors to sense the first orientation of each of the plurality of mirrors and to provide a plurality of mirror orientation outputs, fixing the target to the target positioner, selectably positioning the target, by positioning the target positioner, in the fields of respective ones of the plurality of selectably directable mirrors while each respective one of the plurality of selectably directable mirrors directs the laser beam to a selectable location thereon, viewing the target following impingement of the laser beam thereon and providing laser beam impingement outputs and correlating the plurality of mirror orientation outputs and the laser beam impingement outputs to provide a calibration output for each of the plurality of selectably directable mirrors.

Preferably, the production phase includes at least one of a laser drilling phase, a laser ablation phase and a laser machining phase.

In accordance with a preferred embodiment of the present invention the target includes a substrate, a photochromic layer formed on an upper surface of the substrate, a transparent layer overlaid on the photochromic layer, a metallic layer formed on a lower surface of the substrate and a thermoelectric cooler coupled to a lower surface of the metallic layer. Additionally, the visible fiducial markings are formed within the photochromic layer.

Preferably, the optical system also includes a plurality of adjustable mirror mounts including the plurality of mirror orientation sensors. Additionally, each of the plurality of mirror mounts has two degrees of rotational freedom. Additionally or alternatively, the plurality of mirror mounts include galvanometric motors to which the plurality of mirrors are attached.

In accordance with a preferred embodiment of the present invention the optical system also includes a laser generating the laser beam.

There is also provided in accordance with another preferred embodiment of the present invention a method for calibrating a plurality of selectably directable mirrors arranged to direct a laser beam to a selectable location within a field, the method including orienting each of the plurality of mirrors in a first orientation, sensing the first orientation of each of the plurality of mirrors and providing a plurality of mirror orientation outputs, fixing a target to a target positioner, the target having an area at least as large as the field of each of the plurality of selectably directable mirrors and being operative to provide an optically visible indication of impingement of a laser beam thereon, the target being rewritable and having optically visible fiducial markings, for each one of the plurality of selectably directable mirrors selectably positioning the target, by positioning the target positioner, in the field of the one of the plurality of selectably directable mirrors while the one of the plurality of selectably directable mirrors directs the laser beam to a selectable location thereon, generating laser beam impingement markings thereon, viewing the target following impingement of the laser beam thereon and providing laser beam impingement outputs for the one of the plurality of selectably directable mirrors and erasing the laser beam impingement markings and correlating the plurality of mirror orientation outputs and the laser beam impingement outputs to provide a calibration output for each of the plurality of selectably directable mirrors.

Preferably, the method also includes, for each one of the plurality of selectably directable mirrors, cooling the target subsequent to the erasing.

There is also provided in accordance with another preferred embodiment of the present invention a method for calibrating a plurality of selectably directable mirrors arranged to direct a laser beam to a selectable location within a field, the method including orienting each of the plurality of mirrors in a first orientation, sensing the first orientation of each of the plurality of mirrors and providing a plurality of mirror orientation outputs, fixing a target to a target positioner, the target having an area at least as large as the field of each of the plurality of selectably directable mirrors and being operative to provide an optically visible indication of impingement of a laser beam thereon, the target being rewritable and having optically visible fiducial markings, selectably positioning the target, by positioning the target positioner, in the fields of respective ones of the plurality of selectably directable mirrors while each respective one of the plurality of selectably directable mirrors directs the laser beam to a selectable location thereon, viewing the target following impingement of the laser beam thereon and providing laser beam impingement outputs and correlating the plurality of mirror orientation outputs and the laser beam impingement outputs to provide a calibration output for each of the plurality of selectably directable mirrors.

BRIEF DESCRIPTION OF THE DRAWINGS

The present invention will be more fully understood from the following detailed description of the embodiments thereof, taken together with the drawings, a brief description of which follows.

DETAILED DESCRIPTION OF EMBODIMENTS

Figure 1:
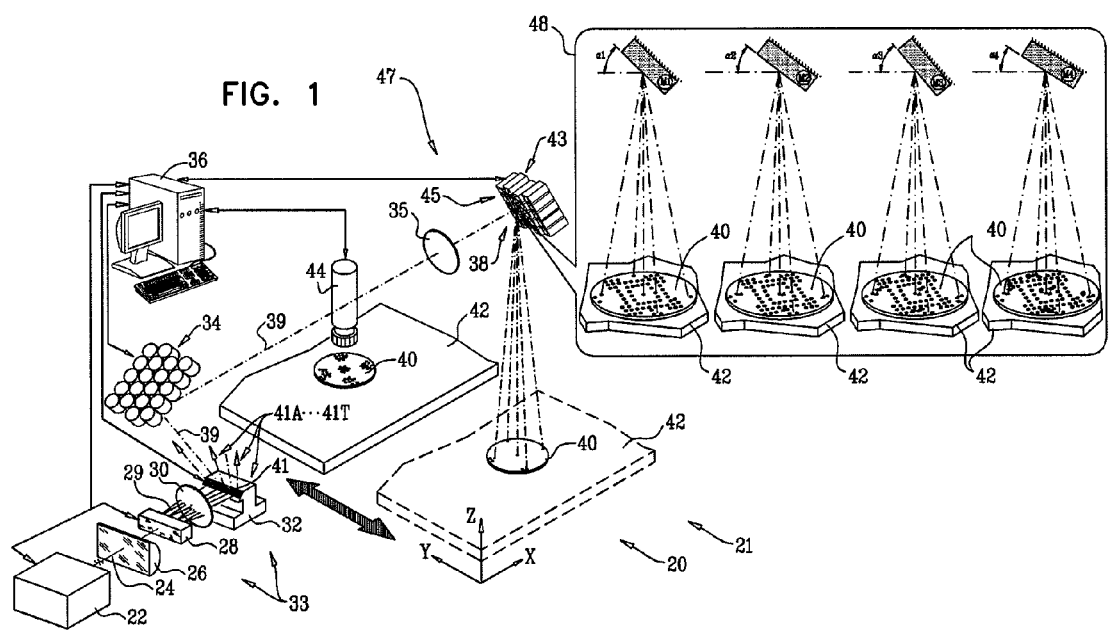
FIG. 1 is a simplified schematic diagram of a mirror calibration apparatus, according to an embodiment of the present invention.

Reference is now made to FIG. 1, which is a simplified schematic diagram of a mirror calibration apparatus 20, according to an embodiment of the present invention. Apparatus 20 comprises an optical system which is under the overall control of a processing unit 36, and which is typically operated by a human controller of the apparatus.

Processing unit 36 typically comprises a general-purpose computer processor, which is programmed in software to carry out functions that are described herein. The software may be downloaded to the processor in electronic form, over a network, for example. Alternatively or additionally, the software may be provided on tangible media, such as optical, magnetic, or electronic storage media. Further alternatively, at least some of the functions of the processor may be carried out by dedicated or programmable hardware.

Apparatus 20 comprises a set of selectably directable mirrors 38, the orientation of each of the directable mirrors being individually controlled by instructions generated by processing unit 36, the instructions enabling the processing unit to select each mirror to be oriented. The directable mirrors are also herein termed orientable mirrors, and act as steering mirrors for beams which impinge upon them. Apparatus 20 includes an optical sensor 44, herein assumed to comprise a camera, which is used as part of an automatic calibration subsystem 47 of the apparatus to calibrate the orientation of each of the mirrors. In addition to sensor 44, also referred to herein as camera 44, the elements of subsystem 47 comprise a movable table 42, a rewritable target 40, and processing unit 36 acting as a correlator. The functions of the elements of automatic calibration subsystem 47 are described in more detail below.

Typically, once the mirrors have been calibrated, camera 44 is not required in the apparatus, and the camera may be removed. Alternatively, the camera may be left in position. Once the orientable mirrors have been calibrated, apparatus 20 may be used as a laser drilling facility 21, wherein the multiple orientable mirrors are used to direct respective laser sub-beams to drill multiple holes in a material (not shown in FIG. 1) mounted on movable table 42, in a production phase of the apparatus. In addition to drilling, it will be understood that in the production phase facility 21 may be used for operations similar to drilling, such as ablation and/or machining of material. Consequently, as will be apparent from the description below, some elements of apparatus 20 perform a dual function, a first function corresponding to the elements being used to calibrate orientable mirrors 38 during a calibration phase of the apparatus, a second function corresponding to the elements being used for laser drilling in the production phase of the apparatus. As is also described below, the calibration phase of apparatus 20 may be implemented in a number of different modes.

Apparatus 20 comprises a laser 22, which is typically a solid-state laser generating a single laser beam 24 of pulses at an ultra-violet wavelength. The parameters of the beam are set according to instructions received from processing unit 36. In one embodiment of the present invention, the beam comprises approximately 30 ns pulses produced at a repetition rate of approximately 100 kHz, each pulse having an energy of the order of 100 µJ, so that an average power of the beam is approximately 10 W. Beam 24 passes through a cylindrical lens 26, which focuses the beam to a substantially collimated beam that is transmitted to an acousto-optic deflector (AOD) 28. Approximately the full energy of the laser pulses may be used in the production phase. In the calibration phase described herein, the laser pulse energy is typically reduced sufficiently to avoid damage to the target.

AOD 28 receives radio-frequency (RF) driving input from processing unit 36, the RF input causing the incident collimated laser beam to be diffracted into one or more sub-beams 29. Sub-beams 29 are typically generated to be in a two-dimensional plane. Processing unit 36 may select the number of the sub-beams, and the distribution of energy between the sub-beams, by varying parameters of the RF input into AOD 28. An AOD which may be used in embodiments of the present invention is the part MQ180-A0,2-UV produced by AA Optoelectronic of Saint-Rémy-Lès-Chevreuse, France.

Sub-beams 29 are transferred by a relay lens 30 to a first set of mirrors 32. Mirrors 32 are oriented to reflect their respective incident beams, as a three-dimensional set of sub-beams 41, to a second set of mirrors 34. For clarity, in FIG. 1 only a path 39 of one of the three-dimensional set of sub-beams is shown. In the following description, each sub-beam of set 41 is distinguished, as required, by a letter suffix. Thus, if as illustrated in FIG. 1 there are twenty mirrors 34 and twenty mirrors 38, set 41 comprises sub-beams 41A, 41B, ... 41T. As appropriate, in the following description the corresponding letter is also appended to elements requiring differentiation. For example, sub-beam 41B is initially generated from sub-beam 29B, and sub-beam 41B is then reflected by mirrors 32B and 34B, and is subsequently reflected by an orientable mirror 38B. Mirrors 32 and 34 are typically fixed in position and orientation, and are configured so that the three-dimensional set of sub-beams reflected from mirrors 34 are generally parallel to each other.

The three-dimensional set of sub-beams reflected from mirrors 34 is transmitted to orientable mirrors 38. Between mirrors 32, mirrors 34, and mirrors 38 are beam conditioning and relay optics, illustrated schematically for purposes of clarity in FIG. 1 by a lens 35. The beam conditioning and relay optics ensure that the sub-beams reflected by mirrors 38 are collimated and narrow. In the following description, the elements of apparatus 20 generating set 41 of sub-beams, i.e. elements 22, 26, 28, 30, 32, 34, and 35, are also referred to herein as a sub-beam generating system 33.

Each mirror of set 38 is coupled to a respective steering assembly, herein termed an adjustable mount 43, in a set of mounts. Each mount 43 of the set is individually controlled by processing unit 36, which is able to direct the orientation of a specific mount, and thus the orientation of the mirror coupled to the mount, within limits according to characteristics of the mount. Each mount comprises a sensor 45 which senses the orientation of the mount, and thus the orientation of the mirror coupled to the mount, and the sensor provides a corresponding output to processing unit 36 so that the processing unit is aware of the orientation of the mount and its mirror.

Although not a requirement for embodiments of the present invention, for simplicity it is assumed herein, by way of example, that processing unit 36 may change the orientation of each mirror by generally the same overall solid angle. In addition, each mount is typically initially set so that its "null orientation," i.e., the direction of the mount about which processing unit 36 changes its orientation, is approximately the same, and so that its respective reflected sub-beam is approximately orthogonal to movable table 42. Each mount 43 is assumed, by way of example, to have two degrees of rotational freedom, and to be able to rotate its attached mirror by two independent angles, $\theta$, $\phi$, in respective orthogonal planes that intersect in the null orientation direction of the mirror. Typically, mounts 43 use galvanometric motors, to which are attached mirrors 38, to implement the two-axis mirror steering required.

Table 42 may move, according to commands received from processing unit 36, in orthogonal x, y, and z directions. In the calibration phase of apparatus 20 described herein, processing unit 36 typically configures beam generating system 33 to radiate only one sub-beam at a time onto rewritable target 40, which is mounted on table 42. As illustrated in an inset 48, table 42 moves target 40 from position to position for each of mirrors 38, each position of the target corresponding to a respective field of operation of a different mirror.

As explained above, each mirror 38 receives a respective sub-beam 41. Each mirror 38 then reflects its respective sub-beam 41 according to the orientation of the mirror. Because of the different physical locations of the mirrors, while the null orientation for each mirror may be generally the same, the reflected sub-beam from each mirror 38 covers a different respective field of operation.

Figure 2A:
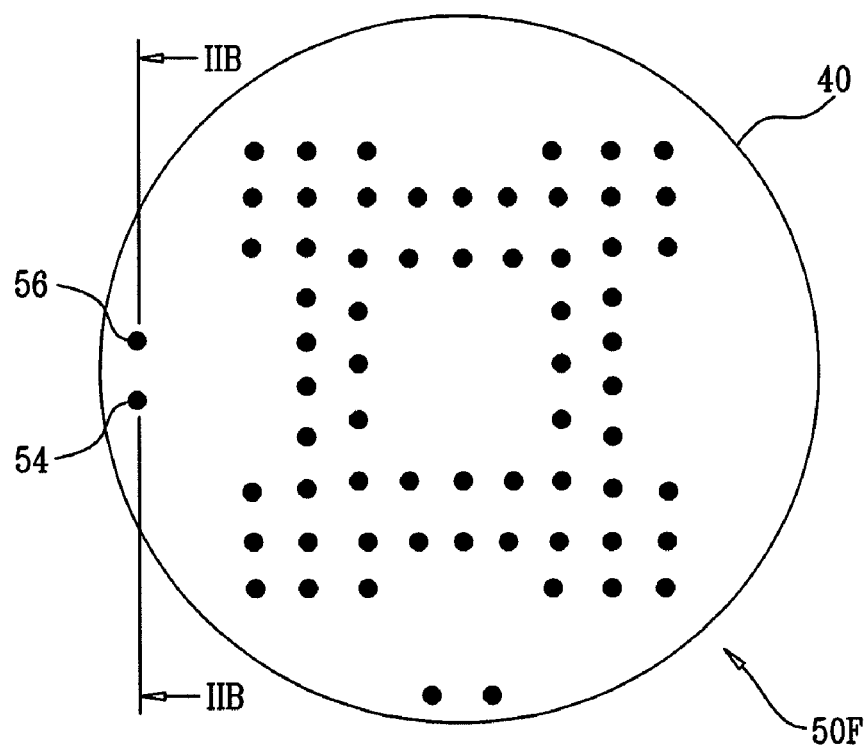
FIGS. 2A and 2B are simplified schematic diagrams of a target used in the apparatus, according to an embodiment of the present invention.
Figure 2B:
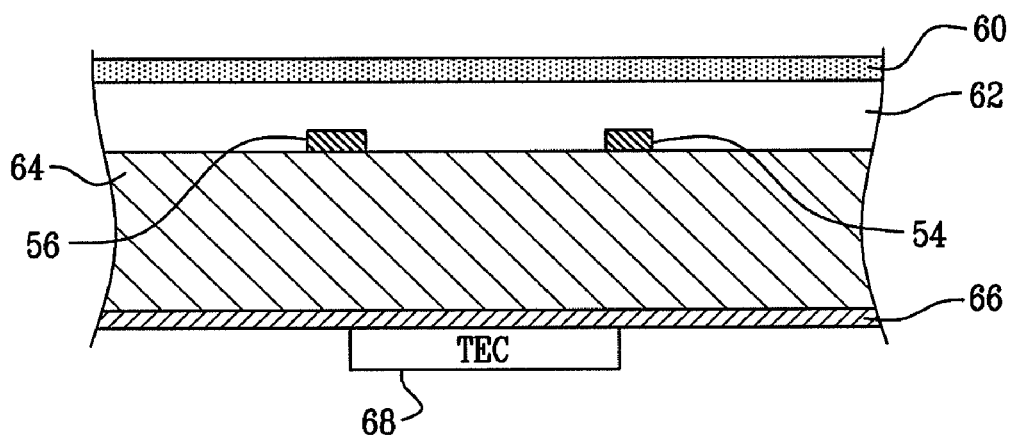

FIGS. 2A and 2B are simplified schematic diagrams of target 40, according to an embodiment of the present invention. FIG. 2A shows a top view of the target. FIG. 2B shows a partial cross-section of the target. The target is set to have an area at least as large as the field of operation of each of the mirrors at table 42. The shape and dimensions of target 40 are typically chosen to be greater than the largest of such fields of operation. In the following description, target 40 is assumed, by way of example, to be circular, with an approximate diameter of 50 mm.

Target 40 is a multi-layered target constructed on a substrate 64. Substrate 64 is typically a low thermal expansion material such as Zerodur™ glass, so that within operating temperatures of apparatus 20, dimensions of the target, and of elements within the target, are substantially invariant. A metallic layer 66 is formed on the lower surface of substrate 64, and a thermoelectric cooler 68 (TEC) is coupled to the lower surface of layer 66. TEC 68 is used by processing unit 36 to heat and cool target 40 as required.

A photochromic layer 62 is formed on the upper surface of substrate 64, and a protective transparent layer 60 is overlayed on photochromic layer 62. Layer 60 protects the photochromic layer from photochemical deterioration, by minimizing the interaction of the photochromic layer with the oxygen of the air. The photochromic layer 62 is transparent to visible light, until irradiated with radiation from laser 22. The radiation causes a photochromic reaction to occur at the regions of the photochromic material upon which the radiation impinges. The reaction renders the impinged regions substantially opaque in a specific spectral band, typically in the visible range of the spectrum and typically few tens of nm wide, so that the radiation effectively writes visible marks or indications on target 40 at the regions of impingement.

The photochromic layer 62 preserves the visible marks written on the target for a long enough time before the marks fade by thermal decay. The decay typically follows a simple Arrhenius law, where the decay rate is proportional to $$\exp\left(-\frac{E_a}{kT}\right),$$

where $E_a$ is the activation energy of the material, k is Boltzmann's constant, and T is the absolute temperature. Typically the decay time is designed to be hours. The marks can be erased by application of a moderate amount of heat to the target, using TEC 68, the consequent elevated temperature increasing the decay rate significantly. After erasure of the marks, the target is typically then cooled by TEC 68 so that it is able to be rewritten with new visible marks by another irradiation of the target. Cooling is typically required to preserve the long life-time of the marks, as indicated above.

Fiducial marks 50F, are also formed on target 40, and are used as described below. Typically, fiducial marks 50F are formed by overlaying a metal, such as chromium, on the upper surface of substrate 64 and within photochromic layer 62. An example of the structure of the fiducial marks within target 40 is shown in FIG. 2B, wherein fiducial marks 54, 56, included in marks 50F, are shown in cross-section.

Target 40 is configured so that both the fiducial marks and the marks written in the photochromic layer may have a high contrast, as measured with respect to their immediate surroundings. The examining radiation used by sensor 44 is typically selected so as to generate the high contrast. High contrast of the marks is typically achieved by using an LED illumination with its peak emission wavelength at or near the peak of the photochromic material absorption band in its colored form. Substrate 64 is typically configured to be generally diffusive, so as to ensure the high contrast.

Figure 3:
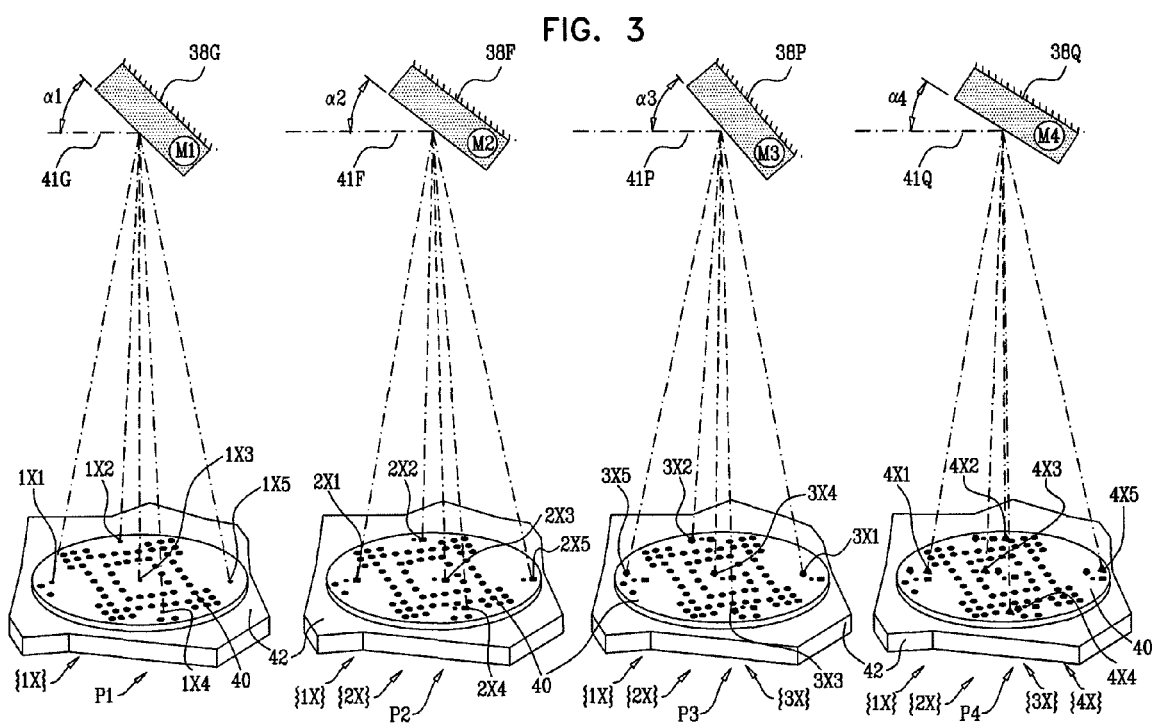
FIG. 3 is a simplified schematic diagram of different stages of operation of the apparatus in a first mode of calibration, according to an embodiment of the present invention.

FIG. 3 is a simplified schematic diagram of different stages of operation of apparatus 20 in a first mode of calibration, according to an embodiment of the present invention. In the first mode of calibration, table 42 acts as a target positioner by moving target 40 sequentially, so that in each position it includes the field of operation of each mirror 38. For each mirror the target is irradiated by a sub-beam reflected from the mirror, which directs the sub-beam to a selectable location within the field of operation of the mirror. After all mirrors have been irradiated, table 42 moves the target out of the fields of operation of the mirrors, and into the field of view of sensor 44.

FIG. 3 corresponds to inset 48 of FIG. 1, and shows target 40 as it is sequentially positioned by table 42 into four different positions P1, P2, P3, and P4. Each position corresponds to the field of operation of a different mirror, assumed by way of example to be the first four mirrors in the calibration sequence. The first four mirrors that are irradiated are assumed, by way of example, to be mirrors 38G, 38F, 38P, and 38Q, and are also referred to herein as mirrors M1, M2, M3, and M4. As required, in the following description a given mirror 38 may also be referred to herein as mirror Mn, where n is a positive integer.

When target 40 is in position P1, processing unit 36 activates sub-beam 41G, typically with a reduced pulse energy as stated above, and ensures that the other sub-beams 41 are not activated. While sub-beam 41G is activated, processing unit 36 rotates mirror M1, using its coupled mount 43, into a small number of different known orientations $a_1, a_2, \ldots$ with respect to its incident sub-beam. It will be understood that each specific orientation is a combination of the two rotational angles $\theta, \phi$, of the mount 43 attached to mirror M1, so that orientation $a_1$ could be more fully written as an ordered pair $(\theta(a_1), (\phi(a_1))$. However, except as necessary, for simplicity in the following description each orientation is represented by a letter and a subscript.

Herein it is assumed, by way of example, that the number of different known orientations is five, so that the different orientations comprise $\{a_1, a_2, \ldots, a_5\}$, also written as $\{\alpha 1\}$. For each orientation in $\{\alpha 1\}$ the beam from M1 is reflected at an angle to the z-axis and is in a plane containing the z-axis. Processing unit 36 maintains the mirror fixed for a period of time for each of the known different orientations, during which period target 40 is irradiated by the reflected sub-beam. The irradiation at the different orientations $\{a_1, a_2, \ldots, a_5\}$ makes respective marks $\{_1x_1, {}_1x_2, \ldots, {}_1x_5\}$, also written as $\{1X\}$, in layer 62 (FIG. 2B). Typically the orientations of $\{\alpha 1\}$ are selected so that marks $\{1X\}$ are approximately evenly distributed over the whole field of operation of mirror M1. Processing unit 36 selects the period of time to be as short as possible, but long enough so that the marks formed by the reflected sub-beam have sufficient contrast to be easily identified by sensor 44. For the exemplary laser described above, a typical period of time allows approximately ten pulses for making each mark, so that the period is approximately 100 µs.

After marks $\{1X\}$ have been made, processing unit 36 switches off sub-beam 41G, and positions table 42 to locate target 40 into position P2, wherein the field of operation of mirror M2 is encompassed by the target. When target 40 is in position P2, processing unit 36 activates sub-beam 41F, and ensures that the other sub-beams 41 are not activated. While sub-beam 41F is activated, processing unit 36 rotates mirror M2 into a set of a small number of different known orientations, $\{\alpha 2\}$, with respect to its incident sub-beam. Typically, as assumed herein, the number of different orientations of set $\{\alpha 2\}$ is the same as that of set $\{\alpha 1\}$. However, there is no necessity for the numbers to be the same, and in some embodiments the numbers may be different.

The orientations of set $\{\alpha 2\}$ are selected so that marks $\{_2x_1, {}_2x_2, \ldots, {}_2x_5\}$, also written as $\{2X\}$, made by the reflection of sub-beam 41F onto target 40 are separated from marks $\{1X\}$. The separation is selected to be sufficient so that sensor 44 is able to distinguish each mark $\{1X\}$ from each mark $\{2X\}$. Marks $\{2X\}$ are formed in substantially the same manner as marks $\{1X\}$. After marks $\{2X\}$ have been formed, processing unit 36 moves table 42 to position target 40 into position P3, wherein the target includes the field of operation of mirror M3, and then into position P4, wherein the target includes the field of operation of mirror M4.

Marks $\{_3x_1, {}_3x_2, \ldots, {}_3x_5\}$ for mirror M3, also written as $\{3X\}$, and marks $\{_4x_1, {}_4x_2, \ldots, {}_4x_5\}$ for mirror M4, also written as $\{4X\}$, are formed substantially as described above for marks $\{1X\}$, using sub-beams 41P and 41Q respectively.

In FIG. 3, for clarity each set of marks $\{1X\}, \{2X\}, \{3X\}$, and $\{4X\}$ is shown using the same symbol for a given set, but different symbols between sets. The shape of the actual marks made by the sub-beams is under the control of processing unit 36. In some embodiments all marks, regardless of whether they are in the same set or in different sets, have substantially the same shape. For example, all marks may be effectively single points on target 40, the point for a particular mark being formed by irradiation at the respective orientation, with the mirror not being moved during the irradiation. The points typically have diameters in a range between approximately 20 µm and approximately 70 µm.

Alternatively, in other embodiments, marks may be formed to have two or more different shapes. Marks having structure are formed as groups of single points, by processing unit 36 moving the mirror about its particular orientation so that the reflected sub-beam from the mirror forms a pre-defined pattern on the target. Examples of patterns that may be used include part of the sides and/or vertices of a triangle or a rectangle, but any other convenient pattern may also be used. Forming a mark as a group of points typically allows a more accurate determination of the position of points, and therefore a more accurate calibration of the mirrors.

Processing unit 36 applies the process that has been described above for the first four mirrors to all mirrors 38. Thus, each mirror 38 generates a set of marks on target 40, processing unit 36 positioning the marks so that they are separated from other marks. The separation is sufficient so that when target 40 is inspected by sensor 44, the sensor, in conjunction with processing unit 36, can distinguish the different marks.

Figure 4:
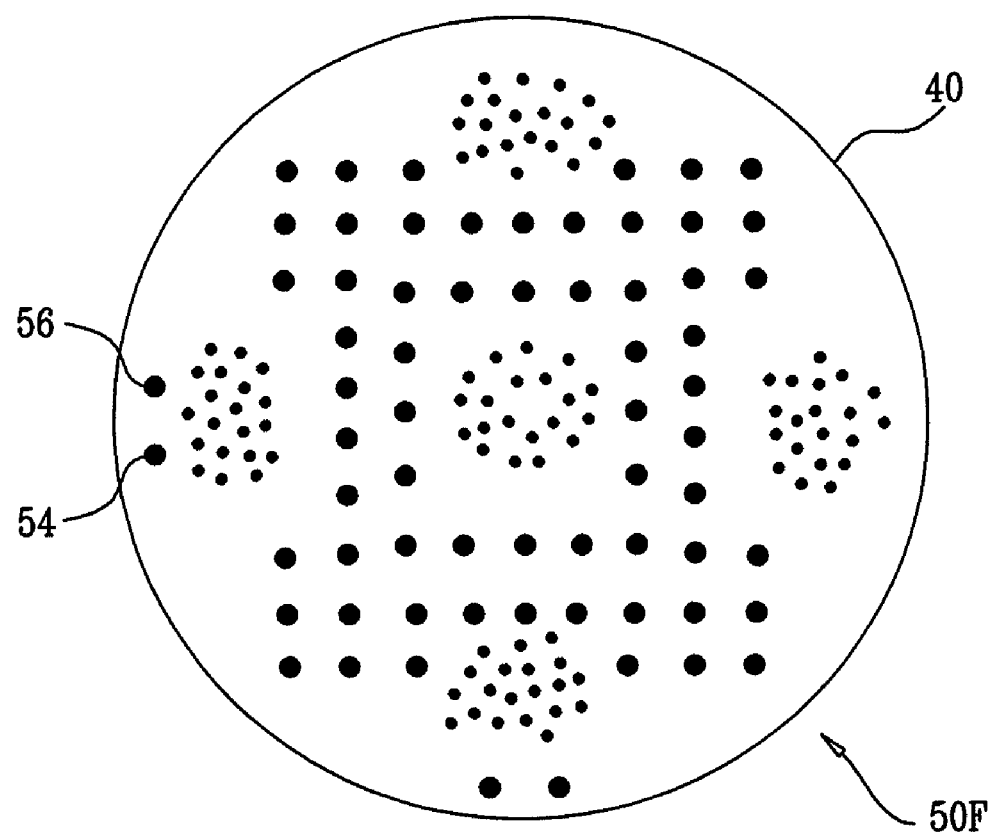
FIG. 4 is a simplified schematic diagram of the target showing markings, according to an embodiment of the present invention.

FIG. 4 is a simplified schematic diagram of target 40, according to an embodiment of the present invention. Target 40 shows exemplary marks made after twenty mirrors 38A, 38B, . . . 38T have been used to irradiate the target, as described above, wherein each mirror generates five marks on the target. In FIG. 4 it is assumed that the marks are single points, but it will be understood that some or all of the marks could be groups of points, as described above.

Returning to FIG. 1, once all mirrors 38 that are to be calibrated have been used to irradiate target 40, table 42 moves the target to be in the field of view of sensor 44. Processing unit 36 uses the image of target 40 formed by sensor 44 to form calibration tables for each mirror 38, as described below with reference to FIG. 5.

Figure 5:
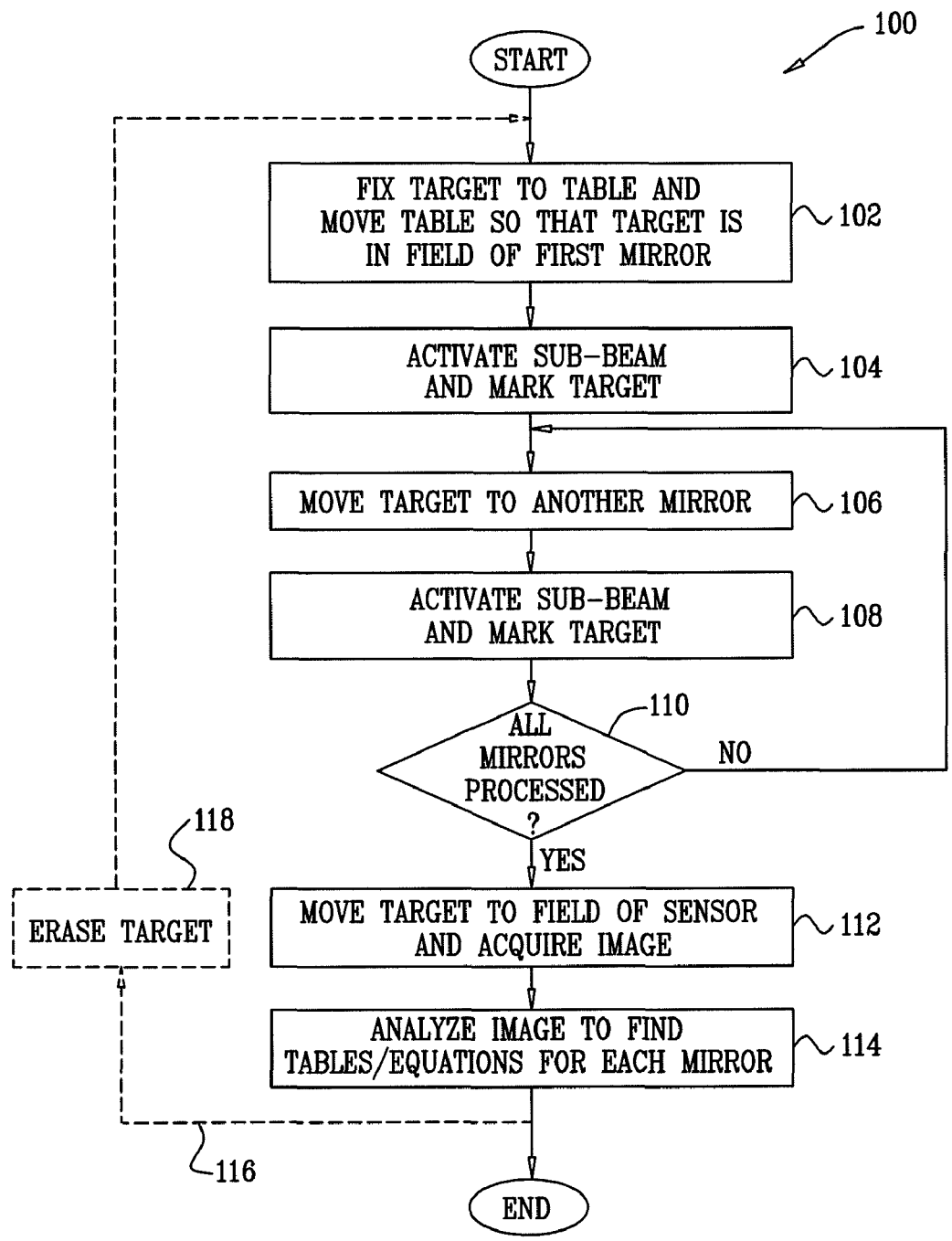
FIG. 5 is a simplified flowchart showing steps performed by a processing unit of the apparatus in generating calibration tables or equations, according to an embodiment of the present invention.

FIG. 5 is a simplified flowchart 100 showing steps performed by processing unit 36 in generating calibration tables or equations for each mirror 38, according to an embodiment of the present invention. The description of the steps of flowchart 100 is assumed to follow the description of the operation of apparatus 20, as described above, and corresponds to the first mode of calibration of apparatus 20.

In a first positioning step 102, target 40 is fixed to table 42, and processing unit 36 positions the table so that the target is in the field of operation of mirror M1.

In a first irradiation step 104, processing unit 36 activates the appropriate sub-beam, in this case sub-beam 41G. The processing unit then orients mirror M1 to its predetermined positions, so as to form marks on the target. For mirror M1 the marks are {1X}.

A subsequent positioning step 106 repeats the operation described in step 102, processing unit 36 positioning the table so that the target is in the field of operation of another of mirrors 38.

A subsequent irradiation step 108 repeats the operations of step 104 for the mirror that has been positioned in step 106.

In a decision step 110, processing unit 36 checks to see if all mirrors 38 have been through the calibration process of the steps described above. If some mirrors have not been through the process, processing unit 36 returns to step 106.

If all mirrors have been through the calibration process, in a target translation step 112 processing unit 36 moves table 42 so that target 40 is in the field of view of sensor 44, and processing unit 36 uses sensor 44 to acquire an image of target 40 and its marks.

In an analysis step 114, using the acquired images of the fiducial marks of the target, the processing unit determines actual (x,y) values of each mark on target 40, and correlates the actual values with the theoretical expected values of {1X}, {2X}, . . . , herein also written as E{1X}, E{2X}, . . . . The correlation may be performed automatically by processing unit 36. For example, for each expected value of {1X}, {2X}, . . . the mark having an actual (x,y) that is closest to the expected value is assumed to be the corresponding mark. Alternatively, the operator of apparatus may at least partly assist processing unit 36 to perform the correlation.

For each mirror 38, processing unit 36 selects the actual (x,y) values of the marks of the mirror. From the selected values, processing unit 36 acts as a correlator to generate a relationship for each mirror between orientations of the mirror, and the actual (x,y) values formed by reflection of the mirror's sub-beam. Processing unit 36 typically generates the relationship using processes of interpolation and/or extrapolation that are well known in the art. Processing unit 36 may store the relationships determined for the mirrors in any convenient form, such as in a calibration table for each mirror, and/or as an equation for each mirror having a general form:

$$(x,y) = f_{Mn}(\theta, \phi) \quad (1)$$

where $f_{Mn}$ is a function for mirror Mn determined by the processing unit.

It will be understood that the values of (x,y) for each table or equation may take account of the different physical positions of each mirror Mn.

After completion of step 114, flowchart 100 typically ends. Optionally, as illustrated by broken line 116, in an erase step 118 the marks on target 40 may be erased so that the target is available for further calibrations of apparatus 20.

From the description of the first calibration mode above, it will be appreciated that all mirrors 38 may be automatically calibrated using one inspection and analysis of target 40, as described in step 114 above. Consequently, the time taken to calibrate all mirrors 38 is small.

Figure 6:
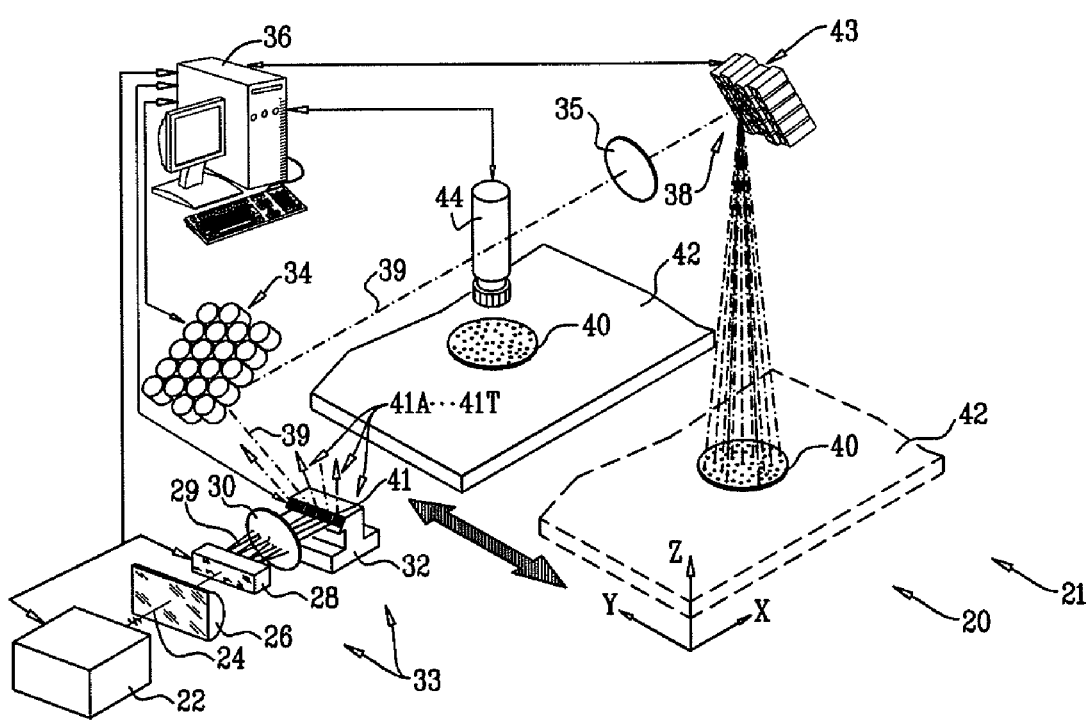
FIG. 6 is a simplified schematic diagram illustrating a second calibration mode of the apparatus, according to embodiments of the present invention.
Figure 7:
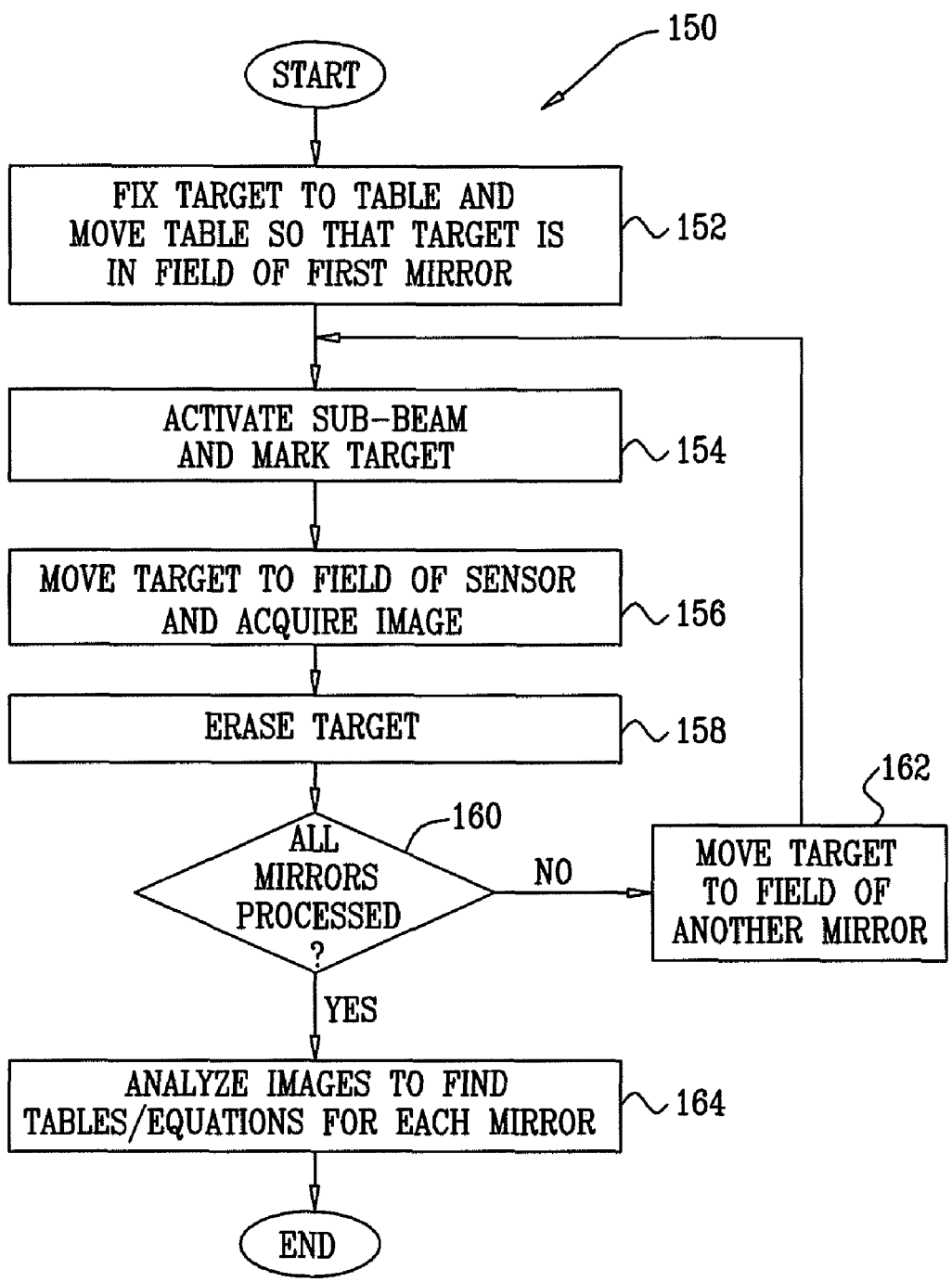
FIG. 7 is a simplified flowchart of steps performed by the processing unit to implement the second mode, according to embodiments of the present invention.

FIG. 6 is a simplified schematic diagram illustrating a second calibration mode of apparatus 20, and FIG. 7 is a simplified flowchart 150 of steps performed to implement the second mode, according to embodiments of the present invention. Apart from the differences described below, the second calibration mode is generally similar to that the first calibration mode, so that elements indicated by the same reference numerals in both FIG. 1 and FIG. 6 are generally similar in construction and in operation.

Unlike the first calibration mode, in the second calibration mode each mirror is separately calibrated using target 40. After each mirror has been calibrated, marks of the target that have been used for the calibration are erased, and the target is used to calibrate another mirror.

In flowchart 150, a positioning step 152 is substantially the same as step 102 (FIG. 5).

A first irradiation step 154 is generally the same as step 104. However, since only one mirror is calibrated at a time, the number of marks used for each calibration may be significantly enlarged. For example, in place of the five marks used in the exemplary description above of the first calibration mode, a typical number of marks used in the second calibration mode is approximately 100.

In a translation step 156, processing unit 36 moves table 42 so that target 40 is in the field of view of sensor 44, and processing unit 36 uses sensor 44 to acquire an image of target 40 and its marks.

In an erase step 158, processing unit 36 activates thermoelectric cooler 68 (FIG. 2B) to heat the target sufficiently to erase the marks made in step 154. Once the marks have been erased, the processing unit typically activates TEC 68 to cool the target, so that it is in a condition to be marked for subsequent irradiations, as explained above.

In a decision step 160, processing unit 36 checks to see if all mirrors have been processed, i.e., if steps 154, 156, and 158 have been applied to each mirror.

If all mirrors have not been processed, in a translation step 162 processing unit 36 moves the table, with target 40 attached, so that the target is in the field of another mirror, and the flowchart returns to the beginning of step 154.

If decision step 160 returns that all mirrors have been processed, then in an analysis step 164 processing unit 36 analyzes each of the images acquired in step 156. Analysis step 164 is generally similar to analysis step 114 described above. From the analysis, processing unit 36 generates a relationship for each mirror, typically in the form of a calibration table and/or equation for each mirror.

Flowchart 150 then ends.

The description above has described two modes of calibration of mirrors 38 by apparatus 20. The first mode enables all mirrors of the apparatus to be calibrated using one pass of target 40 between the fields of the mirrors and the field of view of sensor 44. In the second mode, multiple passes of the target between the fields of the mirrors and the field of view of sensor 44 are required. The first mode of calibration enables all mirrors 38 to be calibrated within a relatively short time period. The second mode of calibration typically requires more time than the first mode, but the calibration provided by the second mode typically has greater accuracy.

It will be understood that the two modes described above are exemplary, and other modes of calibration may be implemented by apparatus 20. For example, mirrors 38 may be organized into groups, and the mirrors in each group may be calibrated substantially as described above for the first mode, but using more than the exemplary number of five marks for each mirror. The target may then be erased, and a subsequent group of mirrors may be calibrated as in the first mode. Organizing the mirrors into groups allows the operator of apparatus to select a desired level of accuracy of the calibration and a time taken for the calibration.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. An optical system comprising:
   a plurality of selectably directable mirrors each arranged to direct a laser beam to a selectable location within a field;
   a plurality of mirror orientation sensors operative to sense the orientation of said plurality of selectably directable mirrors and to provide mirror orientation outputs; and
   an automatic calibration subsystem for automatically calibrating said plurality of selectably directable mirrors, said automatic calibration subsystem comprising:
      a target having an area at least as large as the field of each of said selectably directable mirrors and being operative to provide an optically visible indication of impingement of a laser beam thereon; said target being rewritable and having optically visible fiducial markings;
      a target positioner for selectably positioning said target in the fields of respective ones of said selectably directable mirrors while each respective one of said selectably directable mirrors directs said laser beam to a selectable location thereon;
      an optical sensor operative to view said target following impingement of said laser beam thereon and to provide laser beam impingement outputs; and
      a correlator operative in response to said mirror orientation outputs and said laser beam impingement outputs to provide a calibration output.

2. An optical system according to claim 1 and wherein said optical system may be operative in a calibration phase and in a production phase.

3. An optical system according to claim 2 and wherein said calibration phase comprises:
   orienting each of said plurality of mirrors in a first orientation;
   using said plurality of sensors to sense said first orientation of each of said plurality of mirrors and to provide a plurality of mirror orientation outputs;
   fixing said target to said target positioner;
   for each one of said plurality of selectably directable mirrors:
      selectably positioning said target, by positioning said target positioner, in the field of said one of said plurality of selectably directable mirrors while said one of said plurality of selectably directable mirrors directs said laser beam to a selectable location thereon, generating laser beam impingement markings thereon;
      viewing said target following impingement of said laser beam thereon and providing laser beam impingement outputs for said one of said plurality of selectably directable mirrors; and
      erasing said laser beam impingement markings; and
   correlating said plurality of mirror orientation outputs and said laser beam impingement outputs to provide a calibration output for each of said plurality of selectably directable mirrors.

4. An optical system according to claim 2 and wherein said calibration phase comprises:
   orienting each of said plurality of mirrors in a first orientation;
   using said plurality of sensors to sense said first orientation of each of said plurality of mirrors and to provide a plurality of mirror orientation outputs;
   fixing said target to said target positioner;
   selectably positioning said target, by positioning said target positioner, in the fields of respective ones of said plurality of selectably directable mirrors while each respective one of said plurality of selectably directable mirrors directs said laser beam to a selectable location thereon;
   viewing said target following impingement of said laser beam thereon and providing laser beam impingement outputs; and
   correlating said plurality of mirror orientation outputs and said laser beam impingement outputs to provide a calibration output for each of said plurality of selectably directable mirrors.

5. An optical system according to claim 2 and wherein said production phase comprises at least one of a laser drilling phase, a laser ablation phase and a laser machining phase.

6. An optical system according to claim 1 and wherein said target comprises:
   a substrate;
   a photochromic layer formed on an upper surface of said substrate;
   a transparent layer overlaid on said photochromic layer;
   a metallic layer formed on a lower surface of said substrate; and
   a thermoelectric cooler coupled to a lower surface of said metallic layer.

7. An optical system according to claim 6 and wherein said visible fiducial markings are formed within said photochromic layer.

8. An optical system according to any of claim 1 and also comprising a plurality of adjustable mirror mounts including said plurality of mirror orientation sensors.

9. An optical system according to claim 8 and wherein each of said plurality of mirror mounts has two degrees of rotational freedom.

10. An optical system according to claim 8 and wherein said plurality of mirror mounts comprise galvanometric motors to which said plurality of mirrors are attached.

11. An optical system according to any of claim 1 and also comprising a laser generating said laser beam.

12. A method for calibrating a plurality of selectably directable mirrors arranged to direct a laser beam to a selectable location within a field, the method comprising:
   orienting each of said plurality of mirrors in a first orientation;
   sensing said first orientation of each of said plurality of mirrors and providing a plurality of mirror orientation outputs;
   fixing a target to a target positioner, said target having an area at least as large as the field of each of said plurality of selectably directable mirrors and being operative to provide an optically visible indication of impingement of a laser beam thereon; said target being rewritable and having optically visible fiducial markings;
   for each one of said plurality of selectably directable mirrors:
      selectably positioning said target, by positioning said target positioner, in the field of said one of said plurality of selectably directable mirrors while said one of said plurality of selectably directable mirrors directs said laser beam to a selectable location thereon, generating laser beam impingement markings thereon;

viewing said target following impingement of said laser beam thereon and providing laser beam impingement outputs for said one of said plurality of selectably directable mirrors; and erasing said laser beam impingement markings; and correlating said plurality of mirror orientation outputs and said laser beam impingement outputs to provide a calibration output for each of said plurality of selectably directable mirrors.

13. A method according to claim 12 and also comprising, for each one of said plurality of selectably directable mirrors, cooling said target subsequent to said erasing.

14. A method for calibrating a plurality of selectably directable mirrors arranged to direct a laser beam to a selectable location within a field, the method comprising:

orienting each of said plurality of mirrors in a first orientation;

sensing said first orientation of each of said plurality of mirrors and providing a plurality of mirror orientation outputs;

fixing a target to a target positioner, said target having an area at least as large as the field of each of said plurality of selectably directable mirrors and being operative to provide an optically visible indication of impingement of a laser beam thereon; said target being rewritable and having optically visible fiducial markings;

selectably positioning said target, by positioning said target positioner, in the fields of respective ones of said plurality of selectably directable mirrors while each respective one of said plurality of selectably directable mirrors directs said laser beam to a selectable location thereon;

viewing said target following impingement of said laser beam thereon and providing laser beam impingement outputs; and correlating said plurality of mirror orientation outputs and said laser beam impingement outputs to provide a calibration output for each of said plurality of selectably directable mirrors.

* * * * *